(12) United States Patent
Khait

(10) Patent No.: US 6,818,173 B1
(45) Date of Patent: *Nov. 16, 2004

(54) POLYMERIC BLENDS FORMED BY SOLID STATE SHEAR PULVERIZATION AND HAVING IMPROVED MELT FLOW PROPERTIES

(75) Inventor: Klementina Khait, Skokie, IL (US)

(73) Assignee: Northwestern University, Evanston, IL (US)

(*) Notice: Subject to any disclaimer, the term of this patent is extended or adjusted under 35 U.S.C. 154(b) by 761 days.

This patent is subject to a terminal disclaimer.

(21) Appl. No.: 09/635,655

(22) Filed: Aug. 10, 2000

(51) Int. Cl.⁷ .............................. B29C 49/04
(52) U.S. Cl. .............. 264/540; 264/310; 264/328.17
(58) Field of Search ............... 264/540, 310, 264/328.17, 176.1, 211.21

(56) References Cited

U.S. PATENT DOCUMENTS

| | | |
|---|---|---|
| 3,102,716 A | 9/1963 | Frenkel |
| 3,104,426 A | 9/1963 | Wellman |
| 3,161,437 A | 12/1964 | Le Tourneau |
| 3,342,901 A | 9/1967 | Kosinsky et al. |

(List continued on next page.)

FOREIGN PATENT DOCUMENTS

| | | |
|---|---|---|
| DE | 4130315 | 1/1993 |
| EP | 0596835 | 5/1994 |
| EP | 0841149 | 5/1998 |
| EP | 1004416 | 5/2000 |
| GB | 1548978 | 7/1979 |
| RU | 1213612 | 11/1993 |
| WO | 9515819 | 6/1995 |

*Primary Examiner*—Suzanne E. McDowell
(74) *Attorney, Agent, or Firm*—Liniak, Berenato & White, LLC

(57) ABSTRACT

Solid state shear pulverization is utilized to form a compatibilized homogenous polymeric blend which has improved melt processing properties including a higher melt flow rate than the moldable base polymer without sacrificing, and often increasing the other physical properties including tensile strength, impact strength and elongation. The compatibilized, homogenous polymeric blend improves melt processing of the moldable polymer in injection molding, extrusion molding and blow molding, including the ability to down gauge blow molded films without sacrificing melt strength and the physical properties of the film.

42 Claims, 1 Drawing Sheet

U.S. PATENT DOCUMENTS

| | | |
|---|---|---|
| 3,525,124 A | 8/1970 | Ocker |
| 3,728,053 A | 4/1973 | Stillhard et al. |
| 3,814,566 A | 6/1974 | Stroup |
| 3,874,835 A | 4/1975 | Rossiter et al. |
| 3,889,889 A | 6/1975 | Sawa |
| 3,976,730 A | 8/1976 | Cushing |
| 4,067,826 A | 1/1978 | Emery |
| 4,090,670 A | 5/1978 | Bennett |
| 4,098,463 A | 7/1978 | Lowry |
| 4,181,647 A | 1/1980 | Beach |
| 4,184,772 A | 1/1980 | Meyer |
| 4,250,222 A | 2/1981 | Mavel et al. |
| 4,367,190 A | 1/1983 | Beach |
| 4,511,091 A | 4/1985 | Vasco |
| 4,607,796 A | 8/1986 | Enikolopov et al. |
| 4,607,797 A | 8/1986 | Enikolopow et al. |
| 4,650,126 A | 3/1987 | Feder et al. |
| 4,708,617 A | 11/1987 | Herrington |
| 4,716,000 A | 12/1987 | Kerschbaum et al. |
| 4,772,430 A | 9/1988 | Sauda et al. |
| 4,875,847 A | 10/1989 | Wenger et al. |
| 4,890,996 A | 1/1990 | Shimizu |
| 4,917,834 A | 4/1990 | Hadermann et al. |
| 4,968,463 A | 11/1990 | Levasseur |
| 4,997,131 A | 3/1991 | Heren |
| 5,026,512 A | 6/1991 | Chang |
| 5,073,320 A | 12/1991 | Sterzel |
| 5,088,914 A | 2/1992 | Brambilla |
| 5,395,065 A | 3/1995 | Hirose |
| 5,397,065 A | 3/1995 | Shutov et al. |
| 5,415,354 A | 5/1995 | Shutov et al. |
| 5,743,471 A | 4/1998 | Ivanov |
| 5,814,673 A | 9/1998 | Khait |
| 6,180,685 B1 | 1/2001 | Khait |
| 6,479,003 B1 * | 11/2002 | Furgiuele et al. ........ 264/176.1 |

* cited by examiner

POLYMERIC BLENDS FORMED BY SOLID STATE SHEAR PULVERIZATION AND HAVING IMPROVED MELT FLOW PROPERTIES

FIELD OF THE INVENTION

The present invention is directed to improving the melt properties of polymers by forming polymeric blends using solid state shear pulverization. In particular, it has been found that polymeric blends can be formed by solid state shear pulverization, to yield moldable materials which have excellent molding processability without sacrificing and often improving melt strength. The formed polymeric blends have particular use in blow molding such as in forming blow molded films as well as in other mold processing, such as injection, extrusion, and rotational molding.

BACKGROUND OF THE INVENTION

It is well-known to shape thermoplastic polymers by melt processing. Among the most common melt processing techniques are injection and extrusion molding of objects including those of relatively complex shape and blow molding 3-dimensional objects such as bottles as well as forming films. During injection molding, a polymer, usually in the form of pellets is melted in a screw extruder and the melted polymer is pushed through one or more gates into a mold cavity having a configuration of the article to be formed.

The mold gates are hollow passages in the mold which communicate with the mold cavity and are provided in numbers sufficient to allow the molten polymer to fill every crevice of the mold cavity. An injection mold cycle, thus, involves the injection of the molten polymer through the gates and into the mold cavity, hardening of the molten polymer sufficient to be free-standing once the mold is removed and final removal of the mold and cooling. Obviously, on a commercial scale, it is preferred to reduce the injection mold cycle time and increase production of molded objects. An important component of the cycle time is the flow of the molten polymer through the mold gates and into the mold cavity to completely fill same. Thus, it would be desirable to have a polymer which has a high melt flow rate to reduce the cycle time and further to insure that all crevices or complex portions of the mold cavity are properly filled less the molded article which is formed be incomplete. Molded articles of increasing complexity can be made if the polymer can readily fill the mold cavity. Unfortunately, simply using polymers which have high melt flow rates most often results in the sacrifice in tensile strength, impact strength, and other physical properties of the molded product as polymers which have a high melt flow rate typically have a low molecular weight and consequent lower physical properties. In extrusion molding, the polymer is melted and conveyed by a rotating screw through a die at the end of the extruder barrel which shapes the molten polymer into the desired object. Again, polymers with high melt flow rates are desired to reduce production time. However, polymers with high melt flow rates are not necessarily advantageous since these lower molecular weight materials may not be self-supporting after being shaped at the extrusion die face and often provide the molded object with less than desirable physical properties.

The compromise between melt flow rate and physical properties is no less critical, and most likely more critical in melt shaping a polymeric material by the blow molding process. In blow molding, a molten resin is either extruded or injected into the form of a tube which is expanded by air or other gas into a parison or bubble which is shaped by clamping a mold around the molten parison if an object such as a bottle is to be formed or the parison can be cut or passed between the nip of rollers to form thin films. In order to take advantage of blow molding techniques, a polymer must have sufficient melt strength to be blow moldable into an object. Not only must the polymer have the physical, tensile and thermal properties necessary for specific end use applications, the polymer must have a sufficient melt strength such that the polymer can support its own weight in the molten state after being extruded or injected into a parison. Thus, polymers have sufficient melt strength when the polymers can be extruded downward into the shape of the desired parison without the molten parison breaking. It is desirable to use polymers which are viscous, have a relatively low melt flow rate and which can be self-supporting in the form of the molten parison. On the other hand, polymers which have a low melt flow rate are not readily injected or extruded into the parison, and in the case of blown films, the thickness of the film may be excessive, degrading not only the overall properties of the film but degrading the economics of the blow molding process by increased material costs. Thus, as in injection and extrusion molding, it would be desirable to increase the melt flow rate of the molten polymer so as to improve productivity and form thinner films. At the same time, the melt strength of the polymer must be maintained so as to sustain the parison.

A relatively new type of molding process being increasingly used is rotational molding. In this molding process, a moldable polymer powder is placed within a hollow mold. The hollow mold is simultaneously heated and rotated to melt the powder and spread and evenly coat the inner mold surface with the molten polymer. In this molding process, it would be preferred that the molten polymer have a sufficient melt flow rate to evenly cover the inner mold surface. At the same time, the molded article must have the necessary physical properties for the end use of the rotational molded article.

Attempts have been made to alter the properties of one polymer by mixing or incorporating a second polymer with the first to form a polymeric blend. For example, secondary polymers have been added to primary polymer compositions to improve impact strength, elongation, tensile properties and even melt flow. Unfortunately, in most of these attempts, the whole blend which is formed is less than the sum of its parts. In other words, often, the property sought by adding the secondary polymer is realized at the expense of one or more other properties or, in fact, the properties sought to be achieved are not attainable. There are many, many patents directed to polymeric blends, but only a handful, at most, of polymeric blends are in the commercial market place.

Among the reasons that polymer blends do not often realize the gain in properties which is sought is due to the incompatibility, both chemically and thermodynamically, between the individual resins which make up the blend and, the inability to provide a uniform mix of the two polymers especially if significant viscosity differences are involved. With regard to compatibility, it has been found that blended polymers which are chemically different, e.g. polar and non-polar, or have different thermodynamic properties such as melting point, viscosity, $T_g$, etc., tend to segregate in the blend during and after melt blending. Accordingly, the blend is not molecularly uniform and as such articles molded from the polymeric blends do not realize the advantages in physical and/or chemical properties sought or certain properties are sacrificed at the expense of others. It is known to incorporate a compatibilizing agent, specifically synthesized for particular binary polymer blends, to compatibilize the blend. However, such agents are not universal and are not useful outside the scope of the blend for which they were synthesized. Thus, such compatibilizers are expensive and since they represent a third component to a blend, such agents can actually degrade optical, thermal and other physical properties desired for the end use of the molded objects or continuous films.

If it is desired to increase the melt flow rate of a molding resin, it would appear that this could be readily accomplished by simply mixing in a low viscosity material with the higher viscosity molding resin. Unfortunately, differences in the viscosity between polymers renders it extremely difficult to form a uniform mixture. It has been found that mixing polymers of unmatched viscosity also results in a segregation of the polymers, or layering within the mixing device. If it is possible to mix polymers of unmatched viscosity, there is a period of time from the start of mixing until the major, more viscous component of the blend actually becomes the matrix polymer which has uniformly incorporated therein the minor amounts of lower viscosity material. The period of time for the phase inversion, from when the lower viscosity material acts as the matrix to the point that the majority component actually becomes the matrix phase, can greatly reduce productivity.

A study of the effect of viscosity differences on the ability to melt mix polymers was conducted by Chris E. Scott and Sandra K. Joung at the Massachusetts Institute of Technology, Department of Materials Science and Engineering. The results of this study appear in Scott & Joung, *Viscosity Ratio Effects in the Compounding of Low Viscosity, Immiscible Fluids into Polymeric Matrices*, Polymer Engineering and Science, Vol. 36, No. 12, June 1996 (hereinafter "Scott & Joung"), the contents of which are incorporated herein by reference.

According to Scott & Joung, many low viscosity, immiscible fluids are difficult to incorporate into polymer matrices because of thermodynamic immiscibility and a large mismatch of melt viscosities. A model system was used in their study to determine the mechanisms and kinetics of mixing in such formulations. The model system consisted of a series of different molecular weight polyethylenes (PE) in polystyrene (PS). The viscosity ratio (major/minor) at 180° C. and 100/s was varied from 1.43 to 333. During the study, phase inversion of these formulations in response to compounding was observed. The phase inversion was associated with a transition from low to high mixing torque during compounding. This change was primarily due to an increase in the blend viscosity caused by the morphological transformation. The melting behavior during compounding depended on the melt viscosity of the polyethylene.

According to Scott & Joung, a critical viscosity ratio (minor/major) of 10 exists above which softening of the polystyrene, and thus mixing of the two components, was greatly retarded. Even at very low concentrations, low viscosity polyethylene can have a significant effect on the processing behavior. The phase inversion was represented by a sudden rise in mixing torque. After the phase inversion, the mixing torque remained substantially constant. Notably, even at the high temperature of 200° C., it took about five minutes for the phase inversion to occur. At the lower temperatures, it took even longer. The study by Scott & Joung therefore demonstrates that melt mixing of polymers with a viscosity ratio (major/minor) greater than 10 is difficult and time consuming. Such polymers thus are conventionally considered to be practically incompatible.

The study by Scott & Joung also demonstrates that there is no delayed phase inversion when the polymer materials have the same viscosity (i.e. a viscosity ratio of 1) or when the viscosities are sufficiently close to one another. However, when the polymer materials have significant differences in their respective viscosities, a phase inversion is observed in response to prolonged melt mixing. The absence of a delayed phase inversion when a mixture of materials is melt processed, therefore, tends to indicate that the two materials, whether the same or different polymers, are intimately mixed with one another.

A new technology called solid state shear pulverization, developed by the Polymer Technology Center at Northwestern University, converts multi-color, mixed plastics into a homogenous pastel color powder, which is melt processable by all existing plastics fabrication techniques. Molded articles formed from the powder produced by the solid state shear pulverization process have uniform properties. U.S. Pat. No. 5,814,673 issued to Khait describes the solid state shear pulverization process. The entire content of this mentioned patent is herein incorporated by reference. The process of the aforementioned patent involves passing one or more polymeric materials in the solid state through a pulverization device, including modular co-rotating screws fit with only minimal clearance within a barrel. The screw is modified to contain kneading elements, which under shear convert the polymers into a fine powder in the solid state. An important aspect of the process is that cooling is provided to avoid melting so that the polymeric materials always remain in the solid state during the shearing process. The patented solid state shear pulverization process is disclosed as useful for pulverizing two or more incompatible polymers to yield a compatibilized polymeric product, which when molded has uniform properties even in the absence of compatibilizing agents. That the solid state shear pulverization process is capable of providing polymeric particles having good physical properties, uniform color and compatibilization regardless of the differences in the chemical and thermodynamic nature of the polymeric materials which are pulverized, and all done in the solid state, represents a drastic leap forward in processing ordinarily incompatible multicomponent polymeric blends. Heretofore even blending of two polymers required the addition of expensive, specifically synthesized compatibilizing agents, property-enhancing additives or simply could not have been achieved by previous conventional melt-blending techniques. The patented solid state shear pulverization process is particularly useful for processing multi-color, multi-component polymeric scrap for recycle as well as for providing a unique method of blending scrap and/or virgin polymers to provide a polymeric material which is compatibilized without the need for the additional expensive compatibilizing agents.

U.S. Pat. No. 5,814,673 includes numerous examples directed to solid state shear pulverization of multi-component plastic materials including mixtures of two or more of the following polymers; high density polyethylene, linear-and low density polyethylene, polypropylene, polyethylene terephthalate, polystyrene and polyvinyl chloride. Improvements in compatibility between diverse polymers is particularly disclosed in U.S. Pat. No. 5,814,673 as well as forming a uniform colored polymeric powder from multi-component and multi-colored polymer blends. The patent further describes that the pulverized blends have improved tensile strength relative to the physical properties of conventionally melt blended materials. However, the patent is not otherwise specifically concerned with improving the melt flow properties of moldable polymeric resins and at the same time not degrading the other physical properties of the polymeric resin which are necessary for the end use of the molded article which is ultimately formed by melting or which provide sufficient melt strength useful in molding processes. No particular polymeric blends are disclosed for improving melt flow rate, nor is any data for polymeric blends formed by solid state pulverization provided showing actual improvement in melt flow rate without sacrificing melt strength.

In U.S. Ser. No. 09/193,690, the present inventor also discloses that the solid state shear pulverization process as described in U.S. Pat. No. 5,814,673 can be used to mix two or more polymeric materials, including materials of widely diverse viscosity, and provide intimate mixing of the materials including providing a stable microstructure of the formed polymeric material. The inventor discloses that it is sometimes desirable to mix polymeric materials having different viscosities so that a polymer having a high molecular weight and, therefore, high viscosity, will retain high "melt strength" in film processing, blow molding and the like, and be provided with a lower viscosity as a result of mixing with the lower viscosity polymer by the solid state shear pulverization process.

It is therefore an object of the present invention to provide a moldable polymeric material with an increased melt flow rate without sacrificing the properties of the polymer which render it useful in melt processing techniques.

It is another object of the present invention to provide a moldable polymeric blend without the need for compatibilizing agents so as to improve the melt flow rate and melt strength properties of the blend relative to the properties of the individual polymeric components which form the blend.

It is another object of the present invention to improve the properties of a moldable base polymeric resin by incorporation therein of a secondary polymeric material which will increase the melt flow rate of the base resin without sacrificing the physical and chemical properties of the base resin.

Still another object of the present invention is to provide a method for providing a compatibilized moldable polymeric blend formed from a base resin and a secondary resin and which has improved melt flow properties relative to the base resin.

It is still another object of the present invention to provide a moldable polymeric blend of a base polymer and a secondary polymer whereby the cycle time for molding the polymeric blend is improved relative to the molding cycle time of the base resin.

Still yet another object of the present invention is to provide a process for forming blown film from a polymeric blend which has been mixed and compatibilized by solid state shear pulverization.

A still further object of this invention is to provide a polymeric blend which can be processed into a blown film of reduced thickness relative to the thickness achievable with either of the polymers forming the blend.

These and other objects and modifications of the present invention will become readily apparent from the accompanying description of the invention and appended claims.

SUMMARY OF THE INVENTION

To achieve the above object and other objects, the present invention provides a unique process of compatibilizing a first moldable polymer material with a second polymeric material so as to increase the melt flow rate of the first moldable polymer without sacrificing and, often, improving the other chemical and physical properties of the moldable polymer blend. The process comprises the steps of providing at least first and second polymer materials; compatibilizing the polymer material by applying mechanical energy thereto through solid state shear pulverization in the presence of cooling, and discharging the compatibilized particles produced. The cooling is sufficient to maintain the polymer materials in a solid state during the pulverization. The pulverization generates a particulate mixture of the polymer materials, which exhibits a more stable microstructure when annealed than mixtures produced by melt mixing of the polymer materials.

According to another aspect of the present invention, a process of intimately mixing polymer materials is provided so as to improve the melt processing properties of the polymer materials. The process comprises the steps of providing at least first and second polymer materials, applying mechanical energy to the polymer materials through solid state shear pulverization in the presence of cooling, to effect more intimate mixing of the first and second polymer materials than would be provided by melt mixing of those materials, and discharging particles produced by applying the mechanical energy. The cooling is sufficient to maintain the polymer materials in a solid state during the pulverization.

In accordance with this invention, a moldable polymer is provided with an increased melt flow rate by blending therewith a second low viscosity polymer. Blending of the polymers is provided by solid state shear pulverization wherein the polymers are mixed and sheared together without melting. The polymer blend which is formed is intimately mixed into a compatibilized powder which can be molded by any conventional molding process, such as injection, extrusion, rotational and blow molding processes. The polymer blend has an increased melt flow rate without sacrificing the other physical and chemical properties of the moldable polymer. Down-gauging or reduction of film thickness in extrusion or blow-molded films is also achievable with the blends of this invention. The solid state pulverized particulates are melt processable by conventional mold processing to form articles of manufacture, including film, having a substantially homogenous color appearance without color streaking or marbleizing. This color homogeneity is achievable regardless of whether the particulates included mixed color polymeric material of the same or different composition. This avoids the need for the addition of pigments and/or compatibilizing agents to the feedstock and the need to paint the molded or extruded product to hide unpleasant colors and color streaking.

In-situ polymer compatibilization of the polymer blend is evidenced, in one instance, by the resulting pulverized polymeric particulates exhibiting a thermogram different from that of the precursor unpulverized material. For example, the pulverized particulates of the invention exhibit a melting peak and/or crystallization peak quite different from that (those) of the unpulverized material. Moreover, molded articles produced from the pulverized particulates of the invention exhibit increased tensile strengths and lack of delamination upon breaking in mechanical testing, this being a further indication of in-situ polymer compatibilization. Substantially increased elongation is also achieved in many instances which is still a further indication of compatibility.

The present invention is also advantageous in that the pulverized particulates are suitable for direct use as a powder feedstock for powder feedstock-using melt processing techniques without the need for palletizing and pellet grinding operations. Moreover, the polymeric materials can be processed in a manner to achieve in-situ compatibilization of different polymers in a once-through pulverization operation without the need for a compatibilizing agent which are often expensive and specifically synthesized for one particular blend. The pulverized particulates may be mixed with fillers, reinforcing agents, flame retardants, antioxidants and other additives commonly used in the plastics industry if desired.

This invention will now be described with respect to certain embodiments thereof, along with reference to the accompanying illustrations.

DETAILED DESCRIPTION OF CERTAIN EMBODIMENTS OF THIS INVENTION

Figure 1:
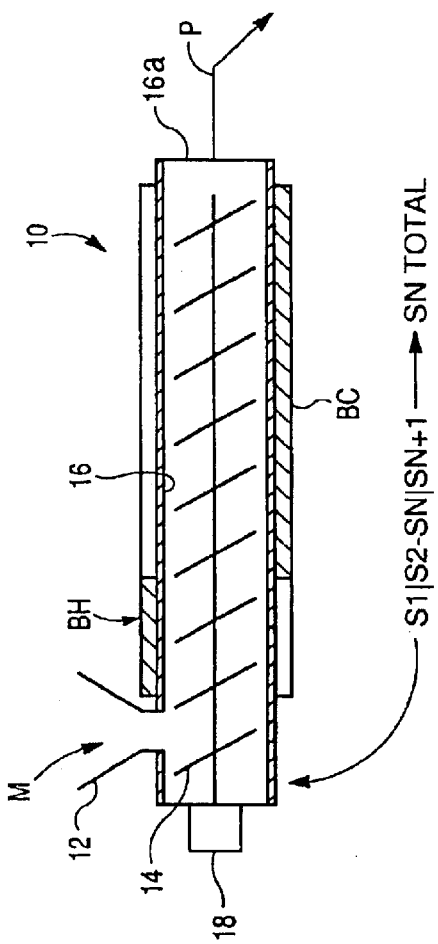
FIG. 1 is a schematic sectional view of a twin-screw pulverizer for practicing an embodiment of the invention.

The invention herein relates to improvements in the melt flow properties of any molding resin including, but not limited to, resins useful in injection, extrusion and rotational molding and blow molding. Non-limiting examples of molding polymers including polyolefins such as high density polyethylene, linear-and low density polyethylene, polypropylene; vinyl polymers such as polystyrene and polyvinyl chloride; polyesters such as polyalkylene terephthalates formed from $C_2$–$C_6$ diols including polyethylene terephthalate, polybutylene terephthalate, polycyclohexane terephthalte; polycarbonate; polyurethane; polyamides such as nylon; polyacetal; polyphenylene oxide; polyphenylene sulfide, etc. can be blended with lower viscosity materials to increase the melt flow rate of the molding polymer without sacrificing the other physical and chemical properties such as tensile strength, impact strength, elongation and thermal properties. Preferably, the lower viscosity material is the same polymer as the molding resin but having a lower molecular weight. With the solid state shear pulverization process, however, uniform compatibilized polymeric blends can be formed from diverse polymers without a compatibilizing agent and have the improved properties sought by this invention. It is preferred that the lower viscosity additive be polymeric. However, it is to be understood that any solid additives which can lower the viscosity of the base resin are useful in this invention including oligomers, solid waxes and solid fatty acids and the like low viscosity additives. The invention is particularly useful in the formation of blown film wherein an increase in the melt flow rate of, for example, a polyolefin resin without sacrificing the melt strength of the resin allows for economical reductions in production time and the formation of thinner films having excellent melt strength with consequent reduction in material costs.

Thus, in accordance with this invention, a moldable polymeric resin is blended with a lower viscosity material which can be the same as the moldable resin but of lower molecular weight or vastly different from the moldable polymeric resin by the solid state shear pulverization process as exemplified in U.S. Pat. No. 5,814,673. In this process, the moldable resin in the form of powder, chips, flakes, pellets or other particulate form is mixed with the lower viscosity material also in the solid state and in particulate form and fed to a pulverizer configured to provide the mixing and shearing of the materials. Importantly, the base molding resin and the lower viscosity additive are maintained in the solid state during the mixing and shearing process in the pulverizer by removing the generated frictional heat to prevent melting. The product from the pulverizer is a fine uniform powder, which can be directly molded if desired, or pelletized. The polymer powder, which is formed is a compatibilized mixture of the base resin and the lower viscosity additive which is most preferably a polymeric resin. Compatibilization can be seen by the uniform color of the molded articles and by the physical properties which are obtained. The compatibilized polymeric powder will have a melt flow rate higher than the base molding resin and will have physical properties such as tensile strength, impact strength, elongation, etc. which will not be disadvantageously degraded from those properties of the base molding resin. In many cases, the physical properties are even improved. Importantly, the properties of the compatibilized polymeric powders which are obtained have been found to be substantially greater than the properties able to be achieved by conventional melt blending the same polymeric materials. In many cases, the solid state shear pulverization process can mix polymers together in the solid state which have been unable to form a uniform blend by conventional melt blending due to phase separation.

Typically, the base molding resin will comprise 2 to 98% by weight of the polymer blend and the lower viscosity additive will comprise 98 to 2 wt. % of the blend. Preferably, the base molding resin will contain 20 to 98 wt. % and the lower viscosity additive 80 to 2 wt. %. Most preferably, the base molding resin will comprise 70 to 98 wt. % and the lower viscosity additive from 2 to 30 wt. % of the blend. Compatibilizing agents are not needed to provide the uniform blend. Other conventional molding additives such as lubricating agents, fillers, antioxidants, UV stabilizers, pigments and the like can be added to the polymeric powder blend before molding. Thus, for injection or extrusion molding, the polymeric powder blend can be melt mixed with the additives and the mixture pelletized for use as a feedstock for an extruder used in injection or extrusion molding. In other instances, the polymeric powder blend is readily moldable direct from a powder and can be simply fed directly to the hopper of the molding apparatus subsequent to mixing with the other additives also in the powdered state or can be mixed with additives at the molding machine.

The particulate molding polymers and low viscosity additive, are supplied as feedstock M to a twin-screw pulverizer 10 shown schematically in FIG. 1 to effect solid state shear pulverization of the materials in accordance with the invention. Further, the particulates components of the blend can be fed to the pulverizer as distinct, sequential feedstocks.

The pulverizer 10 includes a feeder 12 for receiving the feedstock M for transport by the twin screws 14 (only one shown) through the pulverizer barrel zones S1–SN TOTAL where SN TOTAL corresponds to the total number of pulverizer zones. The first zone S1 is a material feed zone communicating directly with the feeder 12. Pulverizer barrel zones S2–SN each may be heated by external electric heater bands BH on the pulverizer barrel 16, depending on the composition and degree of crystallization of the components being fed to the pulverizer. Zones S2–SN are followed by zones SN+1 to SN TOTAL that are cooled by coolant manifold bands or collars BC on the pulverizer barrel 16 (with the exception of certain barrel throttle zones not shown in FIG. 1 which are air cooled).

Preferably, the pulverizer barrel zones S2–SN are cooled by coolant bands similar to coolant bands BC followed by the aforementioned cooled downstream pulverizer zones SN+1–SN TOTAL such that only frictional heating of the molding polymer and low viscosity additive occurs in the pulverizer. Use of the cooled pulverizer barrel zones S2–SN TOTAL is preferred to facilitate temperature control of the material during the pulverization operation and to avoid degradation of the polymer and low viscosity additive which is preferably polymeric. Although coolant bands are described as shown in the figures, any type of cooling means capable of removing the heat of friction generated during the shearing of the particles in the solid state can be used, including internal cooling of the pulverizer barrel.

In FIG. 1, the feedstock M is supplied by the feeder 12 to the twin-screw pulverizer 10 having side-by-side, intermeshing, co-rotating screws 14 (only one shown in FIG. 1) in the barrel 16, although the invention generally envisions using one or more pulverizer screws to achieve solid state pulverization. The screws 14 are rotated in the same direction by drive motor 18 through a gearbox (not shown) to transport the particulate material along the length of the screws 14 and subject the feedstock to temperature and pressure conditions for a given feed rate effective to achieve solid state shear pulverization thereof (without melting of the polymers) and in-situ compatibilization of any thermodynamically incompatible polymers present in the feedstock. The solid state pulverization does not involve the melting of the polymeric material in the feedstock but can involve softening of the polymers in the feedstock.

Uniform pulverized polymeric particulates P (e.g. powder) are discharged at the open (dieless) discharge end 16a of the pulverizer barrel 16. The pulverized particulates P exhibit differential scanning calorimetry (DSC) and electron spin resonance spectroscopy (ESR) characteristics different from those exhibited by the unpulverized feedstock M. Details of the changes in particle morphology which take place in the extruder are given in aforementioned U.S. Pat. No. 5,814,673.

In practicing the invention to achieve solid state shear pulverization of the feedstock M in the manner described hereabove, the twin-screw pulverizer 10 can comprise for purposes of illustration and not limitation the Model PT 25, PT 40A or Model PT 60 twin-screw pulverizers (25, 40 and 60 mm inside diameter, respectively) manufactured by Berstorff GmbH, PO Box 610360, Hannover 1 Germany. The above-mentioned co-rotating twin-screw pulverizers include twin, side-by-side intermeshing screws having a modular construction wherein each screw includes a series of standard screw elements mounted end-to-end in a selected sequence on a continuous screw shaft. The screw elements or stages include fluted transport elements, kneading or shearing elements, and spacer elements mounted in a selected sequence on the continuous shaft to accommodate variations in pulverization parameters and feedstock compositions, as necessary. In particular, the screws 14 can be modified by selection of appropriate transport elements, kneading or shearing elements, and spacer elements and their sequential arrangement and element lengths along the axis of the screw shaft.

Moreover, the named twin screw pulverizers include a barrel 16 having a modular construction wherein a series of standard barrel sections or zones are secured (e.g. bolted) together end-to-end to provide a continuous pulverizer barrel 16. The barrel sections can be adapted to have the electrical heating bands BH or the liquid cooling manifold bands BC mounted thereon for controlling temperature of the pulverized material, although other means of cooling can be used.

The PT-25, PT-40 and PT-60 twin screw pulverizers are available from Berstorff Corporation, Germany. In addition, twin screw pulverizers of this general type are described and shown in U.S. Pat. No. 4,607,797, the teachings of which are incorporated herein by reference.

Figure 2:
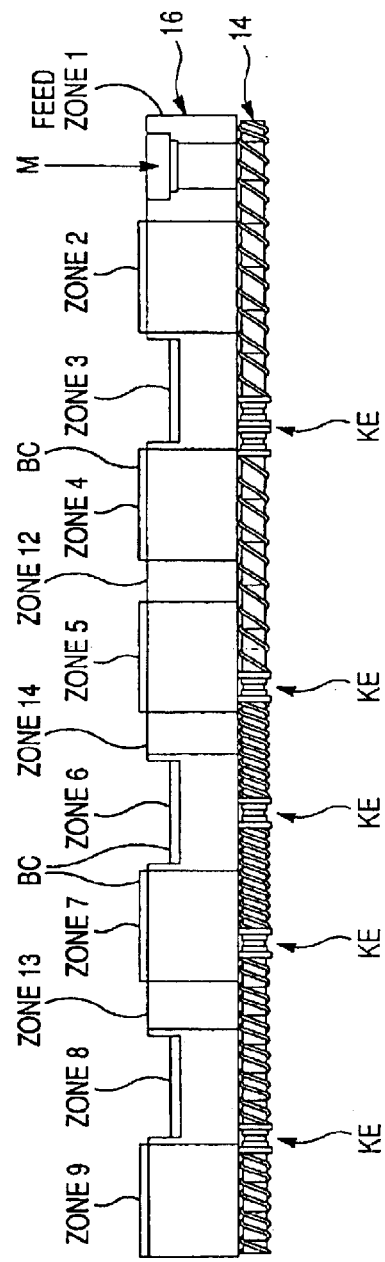
FIG. 2 is an elevational view of a representative screw used in practicing the invention when polymer materials are subjected to solid state shear pulverization in the pulverizer barrel (partially shown).

The invention is not to be construed as limited to the particular type or sequence of screw elements and barrel sections shown in FIG. 2 or the particular twin-screw pulverizer described. Pulverizer barrel and screw configurations used in practicing the invention can be different from those shown and may depend upon the composition and degree of crystallization of polymer components of the feedstock M as well as other factors in order to achieve solid state shear pulverization and in-situ polymer compatibilization of the feedstock M to pulverized particulates in accordance with the invention.

The feedstock M is preferably subjected to solid state shear pulverization in the pulverizer 10 in a once-through operation by rotation of the twin screws 14 in the same directions by motor 18 so as to transport the feedstock M along the length of the screws 14 and subject the feedstock M to temperature and pressure conditions (for a given feedstock feed rate through the pulverizer) effective to achieve solid state shear pulverization (without melting) of the particulates and in-situ polymer compatibilization of thermodynamically incompatible polymers present in the feedstock M. The solid state pulverization does not involve melting of the polymeric material in the feedstock but can involve softening of one or more of the polymers in the feedstock.

With respect to the temperature parameter at a given feedstock feed rate, the feedstock M can be heated at the initial pulverizer barrel sections nearest the feed zone depending upon the composition of the feedstock M followed by cooling in all subsequent barrel zones of the pulverizer to maintain proper temperature control for solid state pulverization, in-situ polymer compatibilization, if necessary, and production of desired powder size.

Preferably, the feedstock M is subjected to only frictional heating in barrel zones 2–4 by engagement with the rotating screws 14. That is, solid state pulverization of the feedstock in barrel zones 2–4 is conducted without heating of the feedstock by external heater bands BH. Instead, all barrel zones 2–9, are cooled by coolant manifold barrels or collars BC or other means disposed in contact or communication with the pulverizer barrel. Pulverization occurs in cooled barrel zones where spaced kneading or shearing elements KE are located. This heatless pulverization of the feedstock M is advantageous to avoid heat degradation of the polymers.

In general, the temperature of the feedstock M is maintained at a level below the melting temperature of crystalline polymer components or below the Tg of amorphous polymers in the feedstock M at all barrel zones of the pulverizer 10 regardless of whether barrel zones 2–4 are heated or cooled. In this way, solid state shear pulverization can be conducted in the solid state at all stages of the pulverizer 10. The temperature of the feedstock M at each stage of the pulverizer 10 will depend on the particular feedstock composition being pulverized.

The through-put (e.g. pounds per hour) of the feedstock M through the pulverizer is controlled in conjunction with temperature and pressure to achieve solid state shear pulverization of the particulates. The through-put for given feedstock temperature/pressure parameters needed for solid state shear pulverization of the feedstock M to fine powder can be determined empirically for particular feedstock compositions by suitable adjustment to the rpm of drive motor 16 for screws 14.

By proper selection of the pulverization temperatures, feed rates, pressures and screw configuration and rpm, pulverized polymeric particulates P (e.g. powder) are discharged at the open (dieless) discharge end 16a (i.e. open end without the usual extrusion die) of the pulverizer barrel 16. The particulates P typically are discharged onto a conventional endless conveyor (not shown) or other cooling/transport device, such as a spiral cooling device, capable of cooling powders and transporting powders to a storage location. During transport on the conveyor, the recycled pulverized powder can be allowed to cool to ambient temperature.

The pulverized particulates P of the invention are made without the need for a compatibilizing agent despite the presence of two or more thermodynamically incompatible polymeric materials in the initial feedstock M. Moreover, the pulverized particulates P of the invention can be directly processed (i.e. without pelletization) by conventional rotational molding, blow molding, extrusion (extruded PVC pipe and profiles), and other melt processing techniques requiring powder feedstock.

Once given the above disclosure, many other features, modifications, and improvements will become apparent to the skilled artisan. Such other features, modifications, and improvements are, therefore, considered to be a part of this invention, the scope of which is to be determined by the following claims.

EXAMPLE 1

In this Example, solid state shear pulverization ($S^3P$ utilizing a PT-25 pulverizer from Berstorff, Germany was used in an attempt to improve the melt flow rate of a highly viscous linear low density polyethylene (LLDPE) useful in blow molding films. A highly viscous LLDPE from Dow Chemical (XU61528.20) with a melt flow rate of 0.5 g/10 min. in pellet form was modified by mixing therewith pellets of a low molecular weight LLDPE (Dowlex 2500) also from Dow Chemical with a melt flow rate of 58.0 g/10 min. In this Example and following Examples, the powders made by solid state shear pulverization were directly molded (without prior pelletization) into test bars, using a 1 oz. Battenfeld injection molding machine with a 22 ton clamping pressure. Key physical properties were tested in accordance with ASTM Standards, D638 (tensile strength and elongation), and D1238 (melt flow rate). The results of pulverizing pellets of the individual LLDPE materials by solid state shear pulverization and mixtures of the LLDPE material are shown in Table 1. Solid state shear pulverization was done under high shear conditions in which the outer diameter of the pulverizing screw was approximately the same as the inner diameter of the barrel of the pulverizer. For comparison, properties of the LLDPE mixture formed by melt mixing in a twin screw extruder, palletized and molded in the 1 oz. Battenfeld are also shown.

TABLE 1

Physical Properties of Mixed LLDPE with Unmatched Viscosity.

| Material* | Ratio | Yield | St. Dev. | Ult. | St. Dev. | Elong. % | St. Dev. | MFR g/10' | Meth. of Proc. |
|---|---|---|---|---|---|---|---|---|---|
| LLDPE XU61528.20 | HS 100 | | | 2560 | 99 | 379 | 7 | 0.62 | $S^3P$ |
| LLDPE Dowlex 2500 | HS 100 | 1492 | 24 | 1241 | 34 | 631 | 13 | 58.1 | $S^3P$ |
| LLDPE XU61528.20/ LLDPE Dowlex 2500 | HS 90/10 | | | 2425 | 95 | 393 | 11 | 0.86 | $S^3P$ |
| LLDPE XU61528.20/ LLDPE Dowlex 2500 | MM 90/10 | | | 2237 | 133 | 336 | 5 | 0.58 | TSE |
| LLDPE XU61528.20/ LLDPE Dowlex 2500 | HS 70/30 | | | 2097 | 18 | 478 | 17 | 1.44 | $S^3P$ |
| LLDPE XU61528.20/ LLDPE | MM 70/30 | | | 2053 | 79 | 440 | 62 | 1.19 | TSE |

TABLE 1-continued

Physical Properties of Mixed LLDPE with Unmatched Viscosity.

| Material* | Ratio | Yield | St. Dev. | Ult. | St. Dev. | Elong. % | St. Dev. | MFR g/10' | Meth. of Proc. |
|---|---|---|---|---|---|---|---|---|---|
| Dowlex 2500 | | | | | | | | | |

*Dow Chemical, Midland, MI
LLDPE XU61528.20, MFR 0.5
LLDPE Dowlex 2500, MFR 58.0
HS = High Shear
MM = melt mixed with twin-screw extruder (TSE)

As can be seen, by mixing 10% of the low molecular weight Dowlex 2500 with 90% of the highly viscous molding resin, the melt flow rate was increased from 0.5 to 0.86 by the solid state shear pulverization process. In comparison, by melt mixing the same LLDPE materials at the equivalent ratio, only an insignificant change (within the standard deviation of the test) in melt flow rate was achieved. Also note that the tensile strength and elongation of the LLDPE mixture formed by the solid state shear pulverization process are substantially higher than the properties achieved by melt mixing. Tensile strength of the LLDPE blend is only slightly decreased from the original tensile strength of the solid state shear pulverized highly viscous LLDPE material. Similarly, the properties resulting from a 70/30 blend of the Dow materials, again shows that under the solid state shear pulverization process, physical properties such as tensile strength, elongation and the melt flow rate are improved over the properties of the melt mixed blend. The improvement in melt flow rate allows substantial benefits in the molding process as increased productivity and thinner films result allowing substantial savings in material costs.

EXAMPLE 2

Two virgin homopolymer polypropylenes (PP), 8000 GK having a melt flow rate of 5.0 g/10 min. and 8080 GW having a melt flow rate of 35.0 g/10 min., available from Equistar Chemicals, were blended under solid state shear pulverization. The resulting physical properties of test molded samples are shown in Table 2 along with a comparison of the physical properties of blends formed by melt mixing in a twin screw extruder and test molded. The polypropylenes were pulverized and mixed from pellets.

TABLE 2

Tensile properties and melt flow rate of virgin PP homopolymer mixtures with unmatched viscosity.

| Material*** | Ratio | Yield Mpa [PSI] | Ulti. Mpa [PSI] | Elong. % | Melt Flow Rate* g/10 min | Method of Processing |
|---|---|---|---|---|---|---|
| GK8000/ GW8080 | 10/90 | 33.7 [48976] | 33.8 [4910] | 430 | 31.8 | S³P |
| GK8000/ GW8080 | 10/90 | | 33.7 [4895] | 42 | 30.2 | Melt Extruded** |
| GK8000/ GW8080 | 30/70 | 33.9 [4880] | 33.6 [2902] | 581 | 24.3 | S³P |
| GK8000/ GW8080 | 30/70 | 33.9 [4918] | 18.6 [2693] | 100 | 21 | Melt Extruded |
| GK8000/ GW8080 | 50/50 | 31.9 [4628] | 21.1 [3059] | 600 | 18.2 | S³P |
| GK800/ GW8080 | 50/50 | 34.4 [4992] | 34.1 [4944] | 380 | 15 | Melt Extruded |
| GK8000/ GW8080 | 90/10 | 32.8 [4763] | 20.2 [2935] | 618 | 10.3 | S³P |
| GK8000/ GW8080 | 90/10 | 33.9 [4924] | 17.8 [2582] | 92 | 6.6 | Melt Extruded |

Notes
Pull rate 2 in/min
*at 230° C., 2.16 kg load
**Twin Screw Extruder
***From Equistar Chemicals, LP, Cincinnati, Ohio
PP 8000 GK MFR 5.0
PP 8080 GW MFR 35.0

As can be seen from Table 2, the melt flow rate of the blends formed by the solid state shear pulverization process is higher than that achieved by melt mixing with the twin screw extruder. This is especially significant in the 90/10 blend of the GK 8000/GW 8080. Likewise, the elongation found utilizing the solid state shear pulverization process over the melt extrusion process is remarkably higher. This improvement in elongation is believed to indicate a higher level of compatibility between the two materials which are of unmatched viscosity.

EXAMPLE 3

Similar to Example 2 above, virgin polypropylene co-polymers from Equistar Chemicals, LP were pulverized or melt extruded in a 90/10 mixture as shown in Table 3. What can be seen from Table 3 is that the melt flow rate of the materials formed by the solid state shear pulverization process were higher than the melt flow rate achieved by melt extrusion in a twin screw extruder. Elongation was grossly larger in samples formed from the pulverized blend.

TABLE 3

Tensile properties and melt flow rate of a mixture of virgin PP copolymers after pulverization.

| Material* | Tensile Properties** | | | Melt Flow | |
| --- | --- | --- | --- | --- | --- |
| | Yield PSI [Mpa] | Ultimate PSI [Mpa] | Elong. % | Rate*** g/10 min | Method of Processing |
| PP 6752 HF/ 90/10 PP 8820 HU | 2693 [18.56] | 2555 [17.61] | 613 | 3.06 | S³P |
| PP 8752 HF/ 90/10 PP 8820 HU | 3148 [21.70] | 2497 [17.21] | 171 | 2.95 | Melt Extruded |

*From Equistar Chemicals, LP
8752 HF MFR 2.0
8820 HU MFR 19.0
**Pull rate 2 in/min
***at 230° C., 2.16 kg load

EXAMPLE 4

In this Example, solid state shear pulverization was utilized to mix various polyolefins of unmatched viscosity. Table 4 shows that outstanding physical properties and the successful mixing of these different polymers with different viscosities can be readily achieved by the solid state shear pulverization process.

TABLE 4

Key Physical Properties of Post-Consumer Polyolefin Blends of Unmatched Viscosity Made by S³P

| Run No. | Material/ Ratio | Tensile Properties | | | Izod | HDT | Shore D | MFR, g/10' (190° C., 2.16 kg) |
| --- | --- | --- | --- | --- | --- | --- | --- | --- |
| | | Yield Mpa (PSI) | Ulti. Mpa (PSI) | Elong % | Impact J/M [ft-lb/in] | Deg. C., 264 66 PSI | | |
| 1 | HDPE | | 22.06 [3200] | 16 | 26.74 [0.5] | 58 | 62 | 52.3 |
| 2 | LLDPE | 13.5 [1950] | | 190 | 37.43 [0.7] | 49 | 55 | 112 |
| 3 | PP | 32.48 [4710] | | 375 | 32.09 [0.6] | 92 | 71 | 9.5 |
| 4 | HDPE/LLDPE 40/60 | 16.41 [2380] | | 130 | 32.09 [0.6] | 50 | 58 | 83.6 |
| 5 | HDPE/PP 80/20 | | 20.13 [2920] | 9 | 21.39 [0.4] | 76 | 63 | 41.1 |
| 6 | HDPE/PP 70/30 | | 19.65 [2850] | 8 | 16.04 [0.3] | 78 | 62 | 35.7 |
| 7 | LLDPE/PP 80/20 | | 12.89 [1870] | 12 | 21.39 [0.4] | 58 | 58 | 86.2 |
| 8 | LLDPE/PP 70/30 | | 12.89 [1870] | 8 | 10.70 [0.2] | 59 | 62 | 71.1 |
| 9 | HDPE/LLDPE/PP 60/30/10 | | 19.17 [2780] | 13 | 21.39 [0.4] | 59 | 62 | 58.3 |

Run 4 — Outstanding Properties
Runs 5–8 — Not Conventionally Processable

I claim:

1. A method of preparing a moldable polymeric material comprising the steps of:
   (a) providing a mixture of a moldable polymeric material and a lower viscosity additive, said polymeric material and said lower viscosity additive being in the solid state; and
   (b) applying mechanical energy through solid state shear pulverization in the presence of cooling to said mixture to maintain materials in the mixture in the solid state thereby compatibilizing the mixture to form a homogenous material, said homogenous material having a melt flow rate which is higher than said moldable polymeric material.

2. The method of claim 1, wherein said lower viscosity additive is a polymeric material.

3. The method of claim 2, wherein said polymeric materials are of the same type of polymer.

4. The method of claim 3, wherein said polymeric materials are polyolefins.

5. The method of claim 4, wherein said polyolefins are low density polyethylene.

6. The method of claim 4, wherein said polyolefins are high density polyethylene.

7. The method of claim 4, wherein said polyolefins are polypropylene.

8. The method of claim 1, wherein said homogenous material is in the form of a powder.

9. The method of claim 1, wherein said application of mechanical energy is effected by co-rotating screws.

10. The method of claim 1, wherein said mixture is formed from a first moldable polymer and said lower viscosity additive formed of a second moldable polymer of a different type than said first moldable polymer, said second moldable polymer having a lower viscosity than said first moldable polymer.

11. The method of claim 10, wherein said first and second moldable polymers are each selected from the group consisting of polyolefins, polyesters, polycarbonates, polyamides, vinyl polymers, polyurethenes, polyacetals, polyphenylene oxide, and polyphenylene sulfide.

12. The method of claim 11, wherein said vinyl polymers are selected from polystyrene and polyvinyl chloride.

13. The method of claim 11, wherein said polyolefins are selected from the group consisting of polyethylene and polypropylene.

14. The method of claim 11, wherein said polyesters are polyalkylene terephthalates.

15. An article molded from homogenous material (a) providing a mixture of moldable polymeric material and a lower viscosity additive, said polymeric material and said lower viscosity additive being in the solid state; and (b) applying mechanical energy through solid state shear pulverization in the presence of cooling to said mixture to maintain materials in the mixture in the solid state thereby compatibilizing the mixture to form a homogeneous material, said homogeneous material having a melt flow rate which is higher than said moldable polymeric material.

16. The article of claim 15 in the form of a film.

17. A method of preparing a moldable polymeric material comprising the steps of:

(a) providing a mixture of a moldable polymeric material and a lower viscosity additive, said polymeric material and said lower viscosity additive being in the solid state;

(b) applying mechanical energy through solid state shear pulverization in the presence of cooling to said mixture to maintain materials in the mixture in the solid state thereby compatibilizing the mixture to form a homogenous material, said homogenous material having a melt flow rate which is higher than said moldable polymeric material;

(c) melting said homogenous material; and (d) molding said molten homogenous material.

18. The method of claim 17, wherein said molten homogenous material is injection molded.

19. The method of claim 17, wherein said molten homogenous material is extrusion molded.

20. The method of claim 17, wherein said molten homogenous material is blow molded.

21. The method of claim 20, wherein said molten homogenous material is blow molded into a thin film.

22. The method of claim 17, wherein said lower viscosity additive is a polymeric material.

23. The method of claim 21, wherein said lower viscosity additive is a polymeric material.

24. The method of claim 22, wherein said polymeric materials are of the same type of polymer.

25. The method of claim 23, wherein said polymeric materials are of the same type of polymer.

26. The method of claim 25, wherein said polymeric materials are polyolefins.

27. The method of claim 26, wherein said polyolefins are low density polyethylene.

28. The method of claim 26, wherein said polyolefins are high density polyethylene.

29. The method of claim 2, wherein said moldable polymeric material comprises 20 to 98 wt. % and said lower viscosity additive 2 to 80 wt. % of said mixture.

30. The method of claim 29, wherein said moldable polymeric material comprises 70 to 98 wt. % and said lower viscosity additive 2 to 30 wt. % of said mixture.

31. The method of claim 22, wherein said moldable polymeric material comprises 20 to 98 wt. % and said lower viscosity additive 2 to 80 wt. % of said mixture.

32. The method of claim 31, wherein said moldable polymeric material comprises 70 to 98 wt. % and said lower viscosity additive 2 to 30 wt. % of said mixture.

33. The method of claim 17, wherein said homogenous material is in the form of a powder.

34. The method of claim 33, wherein said homogenous material is melted directly from said powder and said molten homogenous material molded.

35. The method of claim 33, wherein said homogenous material is melted directly from said powder and said molten homogenous material is formed into pellets, said pellets being melted and molded according to step (d).

36. The method of claim 34, wherein said powder is melted and molded simultaneously by rotational molding.

37. The method of claim 2, wherein said lower viscosity additive has a melt flow rate at least five times higher than said moldable polymeric material.

38. The method of claim 4, wherein said lower viscosity additive has a melt flow rate at least five times higher than said moldable polymeric material.

39. The method of claim 22, wherein said lower viscosity additive has a melt flow rate at least five times higher than said moldable polymeric material.

40. The method of claim 26, wherein said lower viscosity additive has a melt flow rate at least five times higher than said moldable polymeric material.

41. The method of claim 37, wherein said lower viscosity additive has a melt flow rate at least ten times higher than said moldable polymer material.

42. The method of claim 39, wherein said lower viscosity additive has a melt flow rate at least ten times higher than said moldable polymer material.

* * * * *